US007840770B2

(12) United States Patent
Larson et al.

(10) Patent No.: US 7,840,770 B2
(45) Date of Patent: Nov. 23, 2010

(54) METHODS AND SYSTEMS FOR MANAGING COMPUTER SYSTEM CONFIGURATION DATA

(75) Inventors: Craig A. Larson, Bothell, WA (US); David L. Allen, Kent, WA (US); Linda A. Hapgood, Seattle, WA (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 778 days.

(21) Appl. No.: 11/550,668

(22) Filed: Oct. 18, 2006

(65) Prior Publication Data

US 2007/0130437 A1 Jun. 7, 2007

Related U.S. Application Data

(60) Provisional application No. 60/741,752, filed on Dec. 2, 2005.

(51) Int. Cl.
*G06F 12/00* (2006.01)
*G01C 22/00* (2006.01)
*G06F 9/44* (2006.01)
*H04M 3/00* (2006.01)

(52) U.S. Cl. ........................... 711/165; 701/24; 701/29; 711/162; 711/170; 717/168; 717/169; 717/170; 717/171; 717/172; 455/418; 455/419; 455/420

(58) Field of Classification Search ................. 711/165, 711/162, 170; 455/431, 426.2, 418–420; 717/168–174; 701/24, 29
See application file for complete search history.

(56) References Cited

U.S. PATENT DOCUMENTS 5,260,874 A * 11/1993 Berner et al. ................. 701/33
6,438,468 B1 * 8/2002 Muxlow et al. ................ 701/3
6,597,294 B1 7/2003 Ariens
6,816,728 B2 * 11/2004 Igloi et al. .................. 455/431
2002/0111720 A1 8/2002 Holst et al.

(Continued)

FOREIGN PATENT DOCUMENTS

WO 02079918 A2 10/2002

OTHER PUBLICATIONS

International Search Report of PCT/US2006/042764; Jun. 1, 2006; 13 pages.

(Continued)

*Primary Examiner*—Kevin L Ellis
*Assistant Examiner*—Mehdi Namazi
(74) *Attorney, Agent, or Firm*—Armstrong Teasdale LLP

(57) ABSTRACT

Methods and systems for managing computer system configuration data are provided. The method includes staging the configuration data in a staging memory accessible to a first application, selecting a path for a transfer of the configuration data from the staging memory to a target memory, emulating a hardware data loader using a second software application adapted to control a transfer of the configuration data from the staging memory to the target memory, and transferring the configuration data from the staging memory to the target memory using the emulator. The method further effectively expands a memory capacity of a Flight Management Computer by providing swappable memory capacity such that a re-certification to Federal Aviation Administration standards of the Flight Management Computer is not triggered.

33 Claims, 4 Drawing Sheets

U.S. PATENT DOCUMENTS

2003/0003872 A1 1/2003 Brinkley et al.
2003/0069015 A1* 4/2003 Brinkley et al. ............. 455/431
2003/0200026 A1 10/2003 Pearson
2003/0208579 A1* 11/2003 Brady et al. ................ 709/223
2005/0026609 A1 2/2005 Brinkley et al.
2005/0065670 A1 3/2005 Tripmaker
2006/0183474 A1 8/2006 Ziarno et al.
2009/0077265 A1* 3/2009 Brinkley et al. ............. 709/249

OTHER PUBLICATIONS

European Exam Report of Application No. 0 6827 353.1—2211; Sep. 22, 2008; 4 pages.

* cited by examiner

METHODS AND SYSTEMS FOR MANAGING COMPUTER SYSTEM CONFIGURATION DATA

CROSS REFERENCE TO RELATED APPLICATIONS

This application claims priority to U.S. Provisional Patent Application Ser. No. 60/741,752 filed Dec. 2, 2005 the contents of which are hereby incorporated by reference.

BACKGROUND OF THE INVENTION

This invention relates generally to enabling the required movement of data with switches, memory and processing power to support aircraft cockpit displays and more particularly, to methods and systems that can be used for displaying moving maps on aircraft cockpit displays.

Airplanes move throughout the world with a variety of electronic connectivity options and availability. Software avionics data loads are a fundamental part of airlines maintenance and operations. The logistics of such data loads are time consuming and require a significant planning effort, touch labor, and an investment in the hardware to carry out the data load. The data entry task is time consuming and provides data to avionics systems after a significant time requirement. Data loading avionics equipment involves securing the necessary paperwork, locating a data loader, locating the data loading media, and then logistically getting them all to airplanes which might have to be updated in a short time period, for example, the Flight Management Computer (FMC) navigational database must be updated at a minimum of every twenty eight days.

Additionally, known FMCs require significant recertification costs when FMC hardware and/or software changes are made. Expanding a memory capability of a current FMC may trigger prohibitive recertification costs.

Currently, a hardware portable data loader and airborne data loader are used in the data loading function, but it requires the airline maintenance personnel to organize getting the data loader and media to the airplane. This is a highly manual process which is difficult to accomplish during the short turnaround times often demanded by commercial airplanes operations.

BRIEF DESCRIPTION OF THE INVENTION

In one embodiment, a method for managing computer system configuration data includes staging the configuration data in a staging memory accessible to a first application, selecting a path for a transfer of the configuration data from the staging memory to a target memory, emulating a hardware data loader using a second software application adapted to control a transfer of the configuration data from the staging memory to the target memory, and transferring the configuration data from the staging memory to the target memory using the emulator.

In another embodiment, an Electronic Flight Bag system includes an electronic data storage for storing and structuring data stored in the Electronic Flight Bag, a user interface for accessing the information in the flight bag, and a cockpit information management aid comprising a software code segment programmed to emulate a hardware data loader, said code segment further programmed to load protocols and functions to permit the Electronic Flight Bag to manage data transfers from at least one source external to the aircraft to and from at least one aircraft line replacement unit.

In yet another embodiment, an aircraft onboard computer data loading system includes an onboard computer system comprising a communications system configured to receive onboard systems configuration data from a source external to the aircraft, a staging memory configured to receive the configuration data from the communications system, an avionics units comprising a target memory configured to receive the configuration data from said staging memory, and a hardware data loader emulator executing on said onboard computer system, said emulator programmed to control a transfer of the configuration data from said staging memory to said target memory.

DETAILED DESCRIPTION OF THE INVENTION

The following descriptions of various embodiments are merely exemplary in nature and is in no way intended to limit the invention, its application, or uses. Additionally, the advantages provided by the preferred embodiments, as described below, are exemplary in nature and not all preferred embodiments provide the same advantages or the same degree of advantages.

Figure 1:
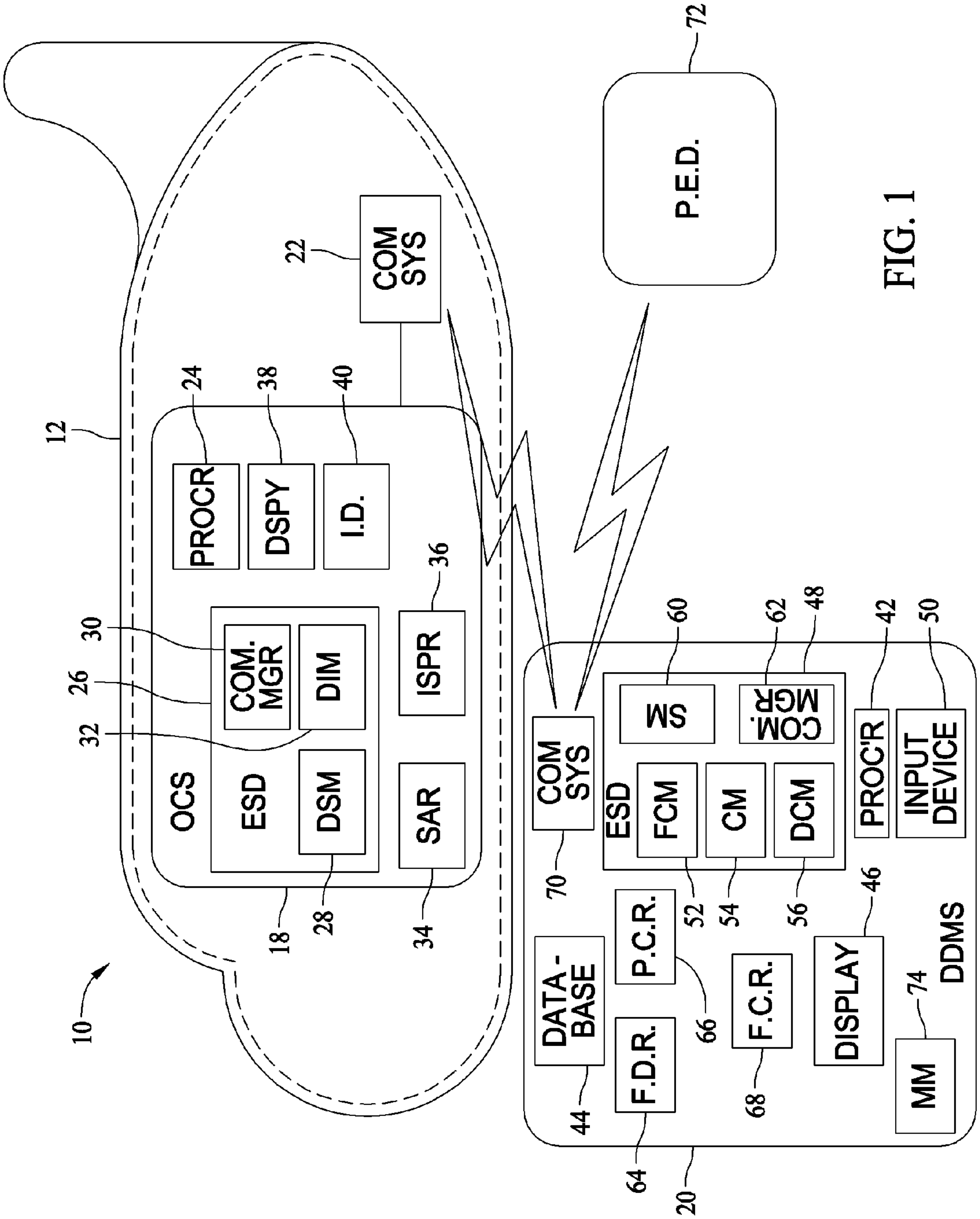
FIG. 1 is a schematic view of a mobile platform distributed, data load management system (DDLMS), in accordance with various embodiments of the present invention.
Figure 2:
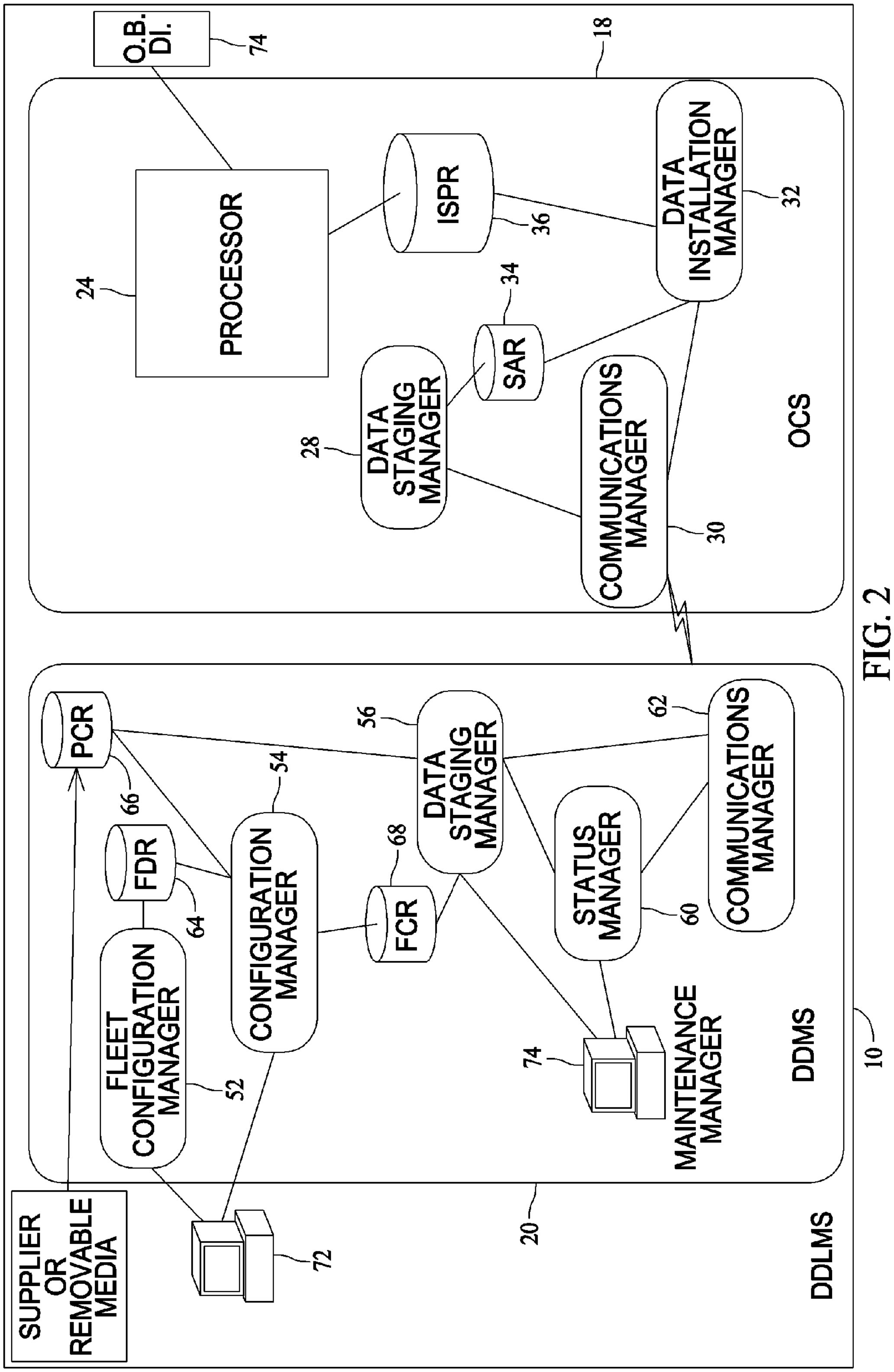
FIG. 2 is another schematic view of DDLMS shown in FIG. 1.

FIGS. 1 and 2 are schematic views of a mobile platform distributed, data load management system (DDLMS) 10, in accordance with various embodiments of the present invention. DDLMS 10 includes a mobile platform operation and maintenance enhancement system (OMES) 12 that provides valuable mobile platform operational, maintenance and performance information and data onboard at least one mobile platform 14. Although mobile platform 14 is described as an aircraft, the invention is not limited to aircraft applications. That is, mobile platform 14 could be any mobile platform such as an aircraft, bus, train or ship.

OMES 12 includes at least one onboard computer system (OCS) 18. Although FIG. 1 illustrates a single OCS 18, it should be understood that in various embodiments, OMES 12 can include a plurality of OCSs 18. However, DDLMS 10 will be described herein referencing at least one OCS 18. DDLMS 10 additionally includes at least one distributed data management system (DDMS) 20 configured to wirelessly communicate with OCS 18. More particularly, OMES 12 further includes one or more onboard communications systems 22 that wirelessly interface with DDMS 20. Communication system(s) 22 may communicate with DDMS 20 using any suitable wireless communication protocol, for example, GPRS (General Packet Radio Service), VHF, wireless IEEE 802.11 communication and/or satellite networks that implement either Internet or ACARSSM (Airplane Communications and Recording System) protocols. ACARSSM can be provided by ARINC, Inc. of Annapolis, Md. or SITA of Geneva, Switzerland. OCS 18 can interface, or communicate, with DDMS 20 via communications system(s) 22.

OCS 18 can be a stand alone system or a subsystem of any other system, network or component onboard mobile platform 14. For example, in various embodiments OCS 18 is an Electronic Flight Bag (EFB) utilized by an operator and/or crew of mobile platform 14 to enhance ease and efficiency of many tasks the operator and/or crew must perform during operation of mobile platform 14. Alternatively, OCS 18 can be a subsystem of an onboard LAN or any other onboard mobile platform control system.

OCS 18 includes a processor 24 for executing all applications, algorithms and software, and enabling all functions of OCS 18. OCS 18 additionally includes an electronic storage device (ESD) 26 for electronically storing a data staging manager application (DSM) 28, a communications manager application 30, a data installation manager (DIM) 32 and other applications, data, information and algorithms. OCS 18 further includes a staging area repository (SAR) 34 and an installed software parts repository (ISPR) 36. Staging area repository 34, installed software parts repository 36 and OCS ESD 26 can each be any alterable computer readable medium device suitable for electronically storing and allowing access to such things as data, information, algorithms and/or software applications executable by OCS processor 24. For example, each of repositories 34 and 36, and OCS ESD 26 can be one or more flash memory chips, erasable programmable read-only memory (EPROM) chips or electrically erasable programmable read-only memory (EEPROM) chips. Alternatively, each of repositories 34 and 36, and OCS ESD 26 can be one or more hard drives, Zip drives, CDRW drives, thumb drives or any other alterable electronic storage device.

OCS 18 additionally includes a display 38 for illustrating graphical and textual data, forms and other information, and an input device 40 such as a keyboard, mouse, stylus or joy stick for inputting data and information to OCS 18 to be stored on OCS ESD 26, staging area repository 34 and/or installed software parts repository 36. It should be understood that OCS processor, ESD, staging area repository, installed software parts repository, display and input device, 24, 26, 34, 36, 38 and 40, respectively, can be components of a stand-alone computer-based system, i.e. OCS 18, or components of a larger system, such as an onboard LAN or an onboard mobile platform control system that collectively comprise OCS 18. Alternatively, OCS 18 can be a stand alone system that is connectable to a larger system, e.g. an onboard LAN, such that various ones of OCS processor, ESD, staging area repository, installed software parts repository, display and input device, 24, 26, 34, 36, 38 and 40 are included in stand alone OCS 18 and others are included in the larger system.

DDMS 20 includes at least one processor 42, at least one database 44, at least one display 46, at least one electronic storage device (ESD) 48 and at least one input device 50. DDMS display 46 can be any display suitable for visually presenting graphics, text and data to a user of DDMS 10. DDMS input device 50 can be any device adapted to input data and/or information into DDMS 20, for example a keyboard, a mouse, a joystick, a stylus, a scanner, a video device and/or an audio device. In various embodiments, DDMS ESD 48 has stored thereon a fleet configuration manager application 52, a configuration manager application 54, a data staging manager application 56, a status manager application 60 and a communications manager application 62. DDMS 20 additionally includes a fleet data repository (FDR) 64 for accessibly storing fleet information data that provides unique identifiers for each mobile platform 14, e.g. an aircraft tail number, and can also define collections of unique identifiers, e.g. groups of tail numbers, which represent a fleet of mobile platforms 14 with common configuration characteristics.

DDMS 20 further includes a published content repository 66 for accessibly storing data and a fleet content repository 68 for accessibly storing data, software applications and configuration files, each identified uniquely with a part number and are available to assign to a mobile platform 14 or a fleet of mobile platforms 14. DDMS 20 further includes one or more communications systems 70 that wirelessly interface or communicate with OCS 18, via onboard communication system 22.

Fleet data repository 64, published content repository 66, fleet content repository 68 and DDMS ESD 48 can each be any alterable computer readable medium device suitable for electronically storing and allowing access to such things as data, information, algorithms and/or software applications executable by DDMS processor 42. For example, each of repositories 64, 66 and 68, and DDMS ESD 48 can be one or more flash memory chips, erasable programmable read-only memory (EPROM) chips or electrically erasable programmable read-only memory (EEPROM) chips. Alternatively, each of the repositories 64, 66 and 68, and the DDMS ESD 48 can be one or more hard drives, Zip drives, CDRW drives, thumb drives or any other alterable electronic storage device.

DDMS database 44 is also an electronic memory device, i.e. computer readable medium, for storing large quantities of data organized to be accessed and utilized during various operation of DDLMS 10. For example, a plurality of look-up tables containing maintenance data, fault data, maintenance procedures and mobile platform metrics may be electronically stored on DDMS database 44 for access and use by DDLMS 10 and users of DDLMS 10. DDMS processor 42 controls all operations of DDMS 20. For example, DDMS processor 42 controls wireless communications and data transfers between DDMS 20 and OCS 18 (i.e., between onboard communications system 22 and DDMS communication system 70), displaying graphics and data on DDMS display 46, and interpreting and routing information and data input by DDMS input device 50. Additionally, DDMS processor 42 controls execution of fleet configuration manager application 52, configuration manager application 54, data staging manager application 56, status manager application 60, communications manager application 62 and various algorithms stored on DDMS ESD 48.

In various embodiments, DDLMS 10 further includes a portable electronic device (PED) 72, e.g. a laptop computer, FDA or any other such device, which communicates, preferably wirelessly, with DDMS 20. PED 72 is adapted to access and utilize data stored in fleet data repository 64, published content repository 66, fleet content repository 68 and/or DDMS ESD 48 and also to input data to DDMS 20 to be stored in fleet data repository 64, published content repository 66, fleet content repository 68 and DDMS ESD 48, if desirable. Generally, PED 72 is utilized by maintenance personnel to aid in performing maintenance and repairs to mobile platform 14.

Figure 3:
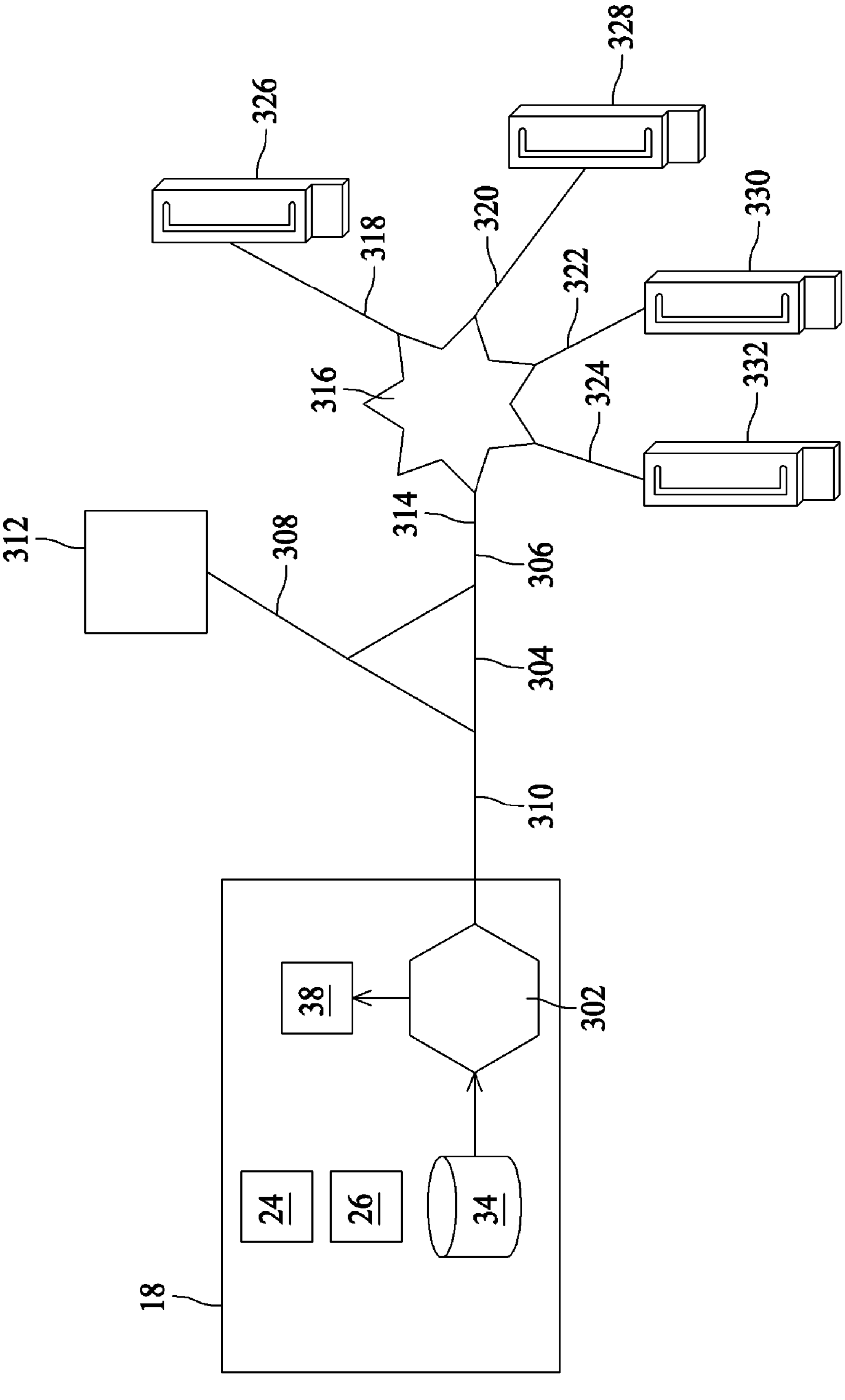
FIG. 3 is a schematic view of the OCS shown in FIG. 1 configured as an Electronic Flight Bag (EFB) in accordance with an embodiment of the present invention.

FIG. 3 is a schematic view of OCS 18 configured as an Electronic Flight Bag (EFB) in accordance with an embodiment of the present invention. OCS 18 includes processor 24 for executing all applications, algorithms and software, and enabling all functions of OCS 18.

OCS 18 additionally includes a display 38 for illustrating graphical and textual data, forms and other information, and an input device 40 such as a keyboard, mouse, stylus or joy stick for inputting data and information to OCS 18 to be stored on OCS ESD 26, staging area repository 34. In the exemplary embodiment, a set of data, such as configuration data, for example, a flight management navigational database is staged onto staging area repository 34. A message is generated and transmitted such that a user is made aware that the data is staged and ready to load. In some instances a full load of data may not be staged in a single transmission from a source external to the aircraft. Less than a full data load may be staged when the aircraft is not within range of the source for a period of time sufficient to complete the download, the transmission may be interrupted due to higher priority data traffic that needs to be accommodated, or other reasons including a temporary or longer term equipment failure. In such instances, OCS 18 maintains track of the staging progress and may wait for retransmission or may request retransmission to complete the staging of the data. A status of the staging is selectably displayed on display 38.

In the exemplary embodiment, OCS 18 includes an EFB data load function 302 comprising a software code segment that is programmed to emulate an ARINC 615 data loader. In various other embodiments, the code segment is programmed to selectably emulate other avionics data loader models. OCS 18 is communicatively coupled to an EFB data load switch 304 that is configured to switch an output 306 between a first input 308 and a second input 310. First input 308 is communicatively coupled to a hardware dataloader 312 such as an ARINC 615 compliant data loader. Such a data loader is typically temporarily coupled to an avionics line replaceable unit to download data that resides on a plurality of floppy disks readable by dataloader 312. Second input 310 is communicatively coupled to OCS 18. Output 306 is communicatively coupled to an input 314 of an avionics data load switch 316. In the exemplary embodiment, avionics data load switch 316 includes a plurality of selectable outputs 318, 320, 322, 324 each coupled to a respective avionics line replacement unit 326, 328, 330, and 332 respectively. In various other embodiments, other numbers of electronics units are communicatively coupled to respective outputs of avionics data load switch 316.

In one embodiment, OCS 18 is configured to store additional FMC navigational databases that are not in current use. For example, navigation databases for areas not currently being traversed may be stored in OCS 18 for loading at a later time. Such storage permits a virtual expansion of the FMC database memory without triggering recertification procedures, which could be cost prohibitive. By swapping data from OCS 18 to the FMC navigation database using dataloader emulation permits storage and subsequent use of more memory than would otherwise be possible using only the storage certified in the FMC.

Figure 4:
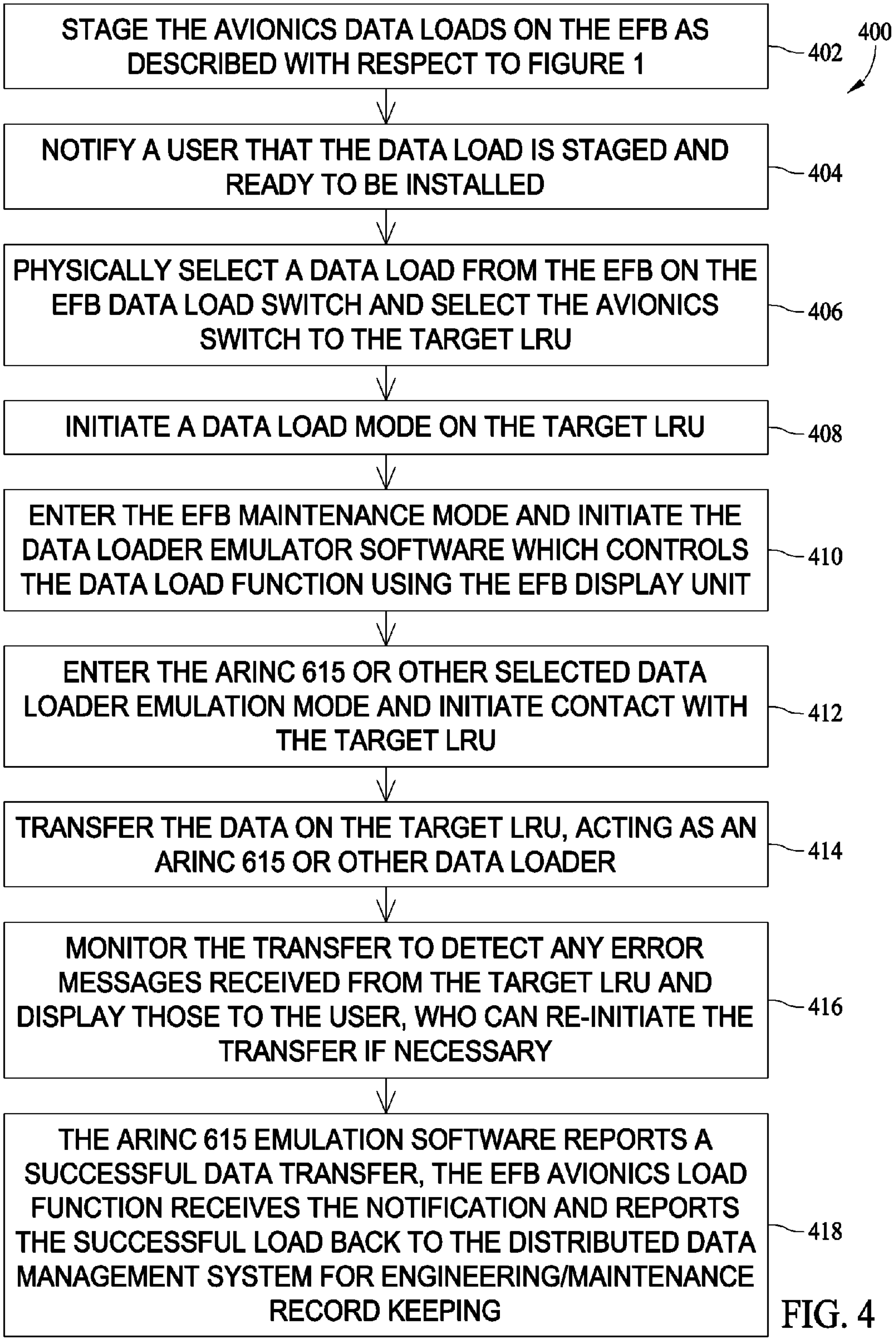
FIG. 4 is a flow chart of an exemplary method of managing computer system configuration data in accordance with an embodiment of the present invention.

FIG. 4 is a flow chart of an exemplary method 400 of managing computer system configuration data in accordance with an embodiment of the present invention. Method 400 includes staging 402 the avionics data loads on the EFB as described above with respect to FIG. 1 and notifying 404 a user that the data load is staged and ready to be installed. The user enters the aircraft to physically select 406 a data load from the EFB on the EFB data load switch and select the avionics switch to the target LRU.

Method 400 includes initiating 408 a data load mode on the target LRU, if necessary and entering 410 an EFB Maintenance mode and initiating data loader emulator software which controls the data load function using the EFB display unit. The emulator software enters 412 an ARINC 615 emulation mode and initiates contact with the target LRU. The emulator software transfers 414 the data to the target LRU, acting as an ARINC 615 or other selected data loader. Any error messages received 416 from the target LRU are displayed to the user, who can re-initiate the data transfer if necessary. The ARINC 615 protocol reports 418 a successful data transfer and the EFB Avionics Load function receives the notification and generates a message to report the successful load back to Distributed Data Management System 20 for engineering/maintenance record keeping.

A technical effect of the various embodiments of the present invention described above includes managing aircraft cockpit displays that are controlled by an information system such as an Electronic Flight Bag to receive updates, load data, and inform an entity of a completion of the data loading task in a timely fashion for time critical data transfers.

The above-described methods and systems for managing computer system configuration data are cost-effective and highly reliable. The system collects avionics data load and updates and holds this data in the EFB for future appropriate data loading to a selectable avionics system. Once the user receives a notification that a software load was staged from the DDM, the user transmits a message to the aircraft with the engineering paperwork and executes the load. The EFB emulates an ARINC 615A or other data loader. After indication of a successful data loading, which is received from the target avionics system via the ARINC 615 protocols, a message is sent to notify the airline engineering department that the software was loaded. The method facilitates maintenance, navigation and situation awareness in a cost-effective and reliable manner.

While the invention has been described in terms of various specific embodiments, those skilled in the art will recognize that the invention can be practiced with modification within the spirit and scope of the claims.

What is claimed is:

1. A method of managing computer system configuration data comprising:

staging the configuration data in a staging memory accessible to a first application;

selecting a path for a transfer of the configuration data from the staging memory to a target memory;

emulating a hardware data loader using a second software application adapted to control a transfer of the configuration data from the staging memory to the target memory; and transferring the configuration data from the staging memory to the target memory using the emulator.

2. A method in accordance with claim 1 wherein staging the configuration data comprises staging a plurality of selectable configuration data sets in the staging memory.

3. A method in accordance with claim 2 wherein a Flight Management Computer system includes a memory that is substantially constrained in capacity to a current capacity and wherein staging a plurality of selectable configuration data sets in the staging memory comprises effectively expanding a memory capacity of the Flight Management Computer such that a recertification to Federal Aviation Administration standards of the Flight Management Computer is not triggered.

4. A method in accordance with claim 1 further comprising generating a notification that the configuration data is staged in the memory and ready to be installed.

5. A method in accordance with claim 1 wherein selecting a path comprises selecting the staging memory using a first data load switch.

6. A method in accordance with claim 1 wherein selecting a path comprises selecting the target memory using a second data load switch.

7. A method in accordance with claim 6 wherein the second data load switch comprises a hardware switch and wherein selecting a path comprises selecting the target memory by physically manipulating the second data load switch by a user.

8. A method in accordance with claim 1 wherein selecting a path comprises initiating a configuration data load mode on the target memory.

9. A method in accordance with claim 1 further comprising:

entering a maintenance mode in the first application; and initiating a second application adapted control loading the configuration from the first memory to the second memory by emulating a hardware data load device.

10. A method in accordance with claim 1 wherein emulating a hardware data loader comprises entering an emulation mode for a selectable hardware data loader.

11. A method in accordance with claim 10 wherein emulating a hardware data loader comprises entering an emulation mode for an ARINC 615 compliant data loader.

12. A method in accordance with claim 1 wherein emulating a hardware data loader comprises emulating an ARINC 615 compliant data loader.

13. A method in accordance with claim 1 further comprising monitoring the transfer of the configuration data from the staging memory to the target memory.

14. A method in accordance with claim 1 further comprising:

receiving an error message from the target memory if a transfer of the configuration data from the staging memory to the target memory fails; and alerting an operator of the data transfer failure.

15. A method in accordance with claim 1 further comprising re-initiating a transfer of the configuration data from the staging memory to the target memory.

16. A method in accordance with claim 1 wherein transferring the configuration data comprises transferring a navigational database.

17. A method in accordance with claim 1 wherein transferring the configuration data comprises reporting a successful transfer of configuration data.

18. An Electronic Flight Bag system comprising:

an electronic data storage for storing and structuring data stored in the Electronic Flight Bag;

a user interface for accessing the information in the flight bag; and a cockpit information management aid comprising a software code segment programmed to emulate a hardware data loader, said code segment further programmed to load protocols and functions to permit the Electronic Flight Bag to manage data transfers from at least one source external to the aircraft to and from at least one aircraft line replacement unit.

19. An Electronic Flight Bag system in accordance with claim 18 further comprising a hardware switch configured to select the at least one aircraft line replacement unit.

20. An Electronic Flight Bag system in accordance with claim 18 wherein said software code segment is programmed to emulate a ARINC 615 compliant data loader.

21. An Electronic Flight Bag system in accordance with claim 18 wherein said software code segment is programmed to selectably emulate a plurality of hardware data loaders including an ARINC 615 compliant data loader.

22. An Electronic Flight Bag system in accordance with claim 18 wherein said Electronic Flight Bag is configured to manage a data transfer from a staging memory to a target memory in an aircraft line replacement unit.

23. An Electronic Flight Bag system in accordance with claim 18 wherein a Flight Management Computer system includes a memory that is substantially constrained in capacity to a current capacity, said Electronic Flight Bag system is further configured to effectively expand a memory capacity of the Flight Management Computer such that a re-certification to Federal Aviation Administration standards of the Flight Management Computer is not triggered.

24. An Electronic Flight Bag system in accordance with claim 18 wherein said Electronic Flight Bag is configured to determine that a data transfer to the staging memory is complete.

25. An Electronic Flight Bag system in accordance with claim 18 wherein said Electronic Flight Bag is configured to determine that a data transfer from at least one source external to the aircraft to the staging memory is complete.

26. An Electronic Flight Bag system in accordance with claim 18 wherein said Electronic Flight Bag is configured to determine that a data transfer from the staging memory to said target memory is complete.

27. An Electronic Flight Bag system in accordance with claim 18 wherein said Electronic Flight Bag is configured to transmit a transfer complete message determine that a data transfer from the staging memory to said target memory is complete.

28. An aircraft onboard computer data loading system comprising:

an onboard computer system comprising a communications system configured to receive onboard systems configuration data from a source external to the aircraft;

a staging memory configured to receive the configuration data from the communications system;

an avionics units comprising a target memory configured to receive the configuration data from said staging memory; and a hardware data loader emulator executing on said onboard computer system, said emulator programmed to control a transfer of the configuration data from said staging memory to said target memory.

29. A system in accordance with claim 28 further comprising a data load switch configured to select a data transfer input from an Electronic Flight Bag executing on said onboard computer system and a hardware data loader.

30. A system in accordance with claim 28 further comprising a an avionics data load switch configured to select a data transfer output to at least one avionics unit target memory.

31. A system in accordance with claim 28 wherein a Flight Management Computer system includes a memory that is substantially constrained in capacity to a current capacity, said aircraft onboard computer data loading system is further configured to effectively expand a memory capacity of the Flight Management Computer such that a re-certification to Federal Aviation Administration standards of the Flight Management Computer is not triggered.

32. A system in accordance with claim 28 further comprising a data load switch and an avionics data load switch, at least one of said data load switch and an avionics data load switch comprising a hardware switch that is physically manipulated between respective positions.

33. A system in accordance with claim 28 wherein said hardware data loader emulator emulates an ARINC 615 data loader.

* * * * *